May 23, 1933. C. A. DUNHAM 1,909,936
PRESSURE REDUCING VALVE
Filed May 17, 1928 2 Sheets-Sheet 1
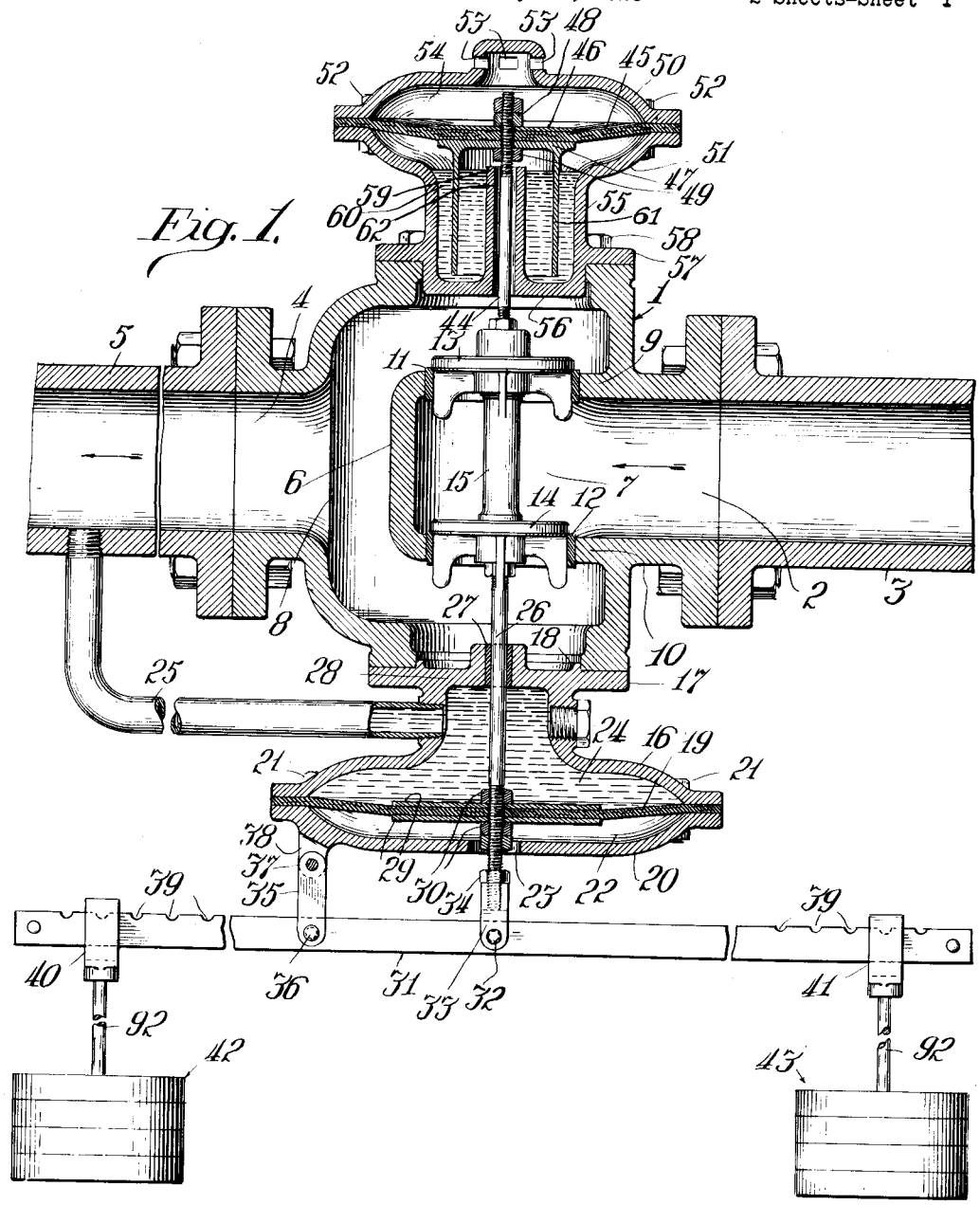
Inventor
Clayton A. Dunham
By Barnett Truman
Attorneys.

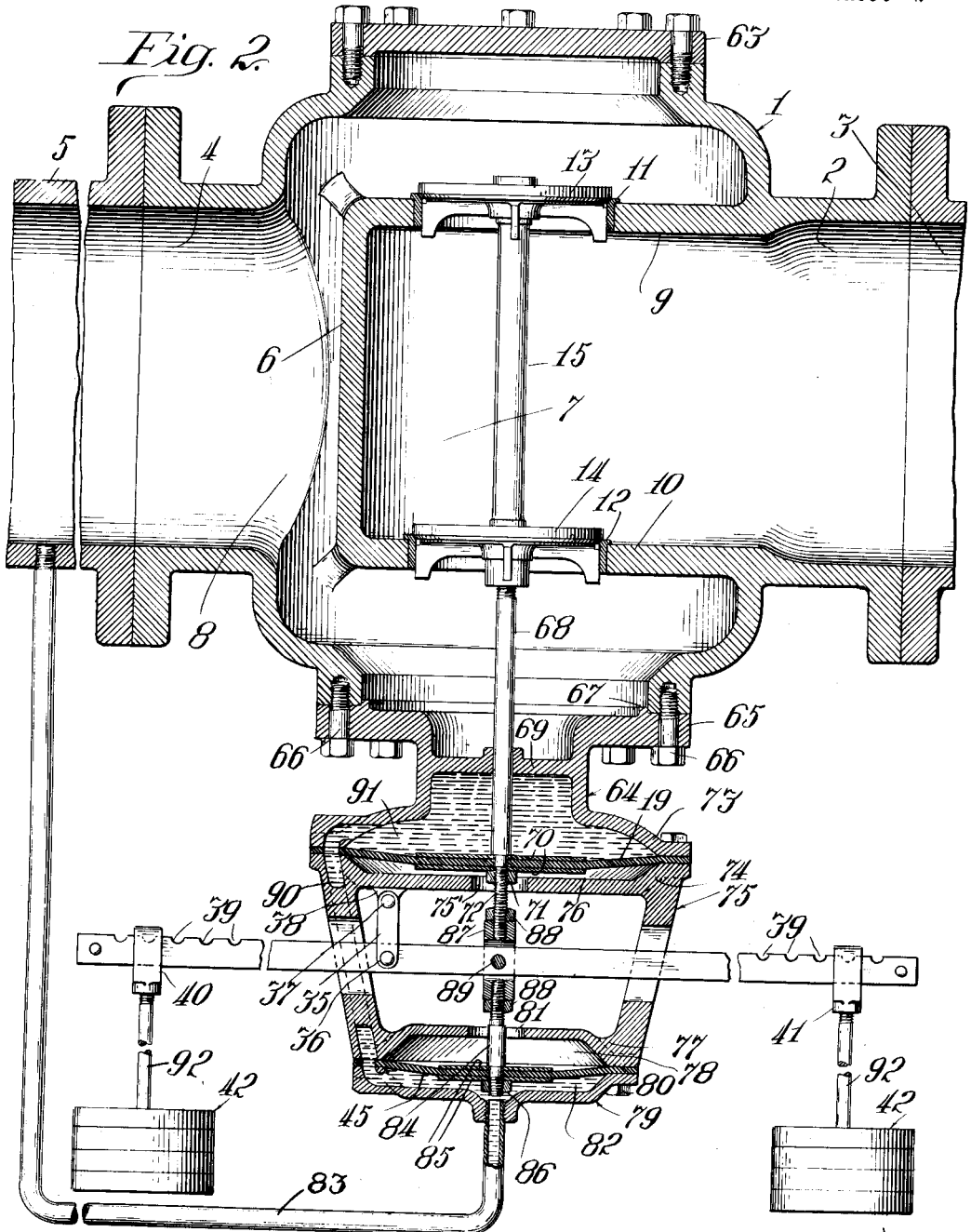

Patented May 23, 1933

1,909,936

UNITED STATES PATENT OFFICE

CLAYTON A. DUNHAM, OF GLENCOE, ILLINOIS, ASSIGNOR TO C. A. DUNHAM COMPANY, OF MARSHALLTOWN, IOWA, A CORPORATION OF IOWA

PRESSURE REDUCING VALVE

Application filed May 17, 1928. Serial No. 278,532.

This invention relates to a new and improved reducing valve, and more particularly to a valve adapted to reduce the pressure of steam from a relatively high pressure source to selected sub-atmospheric pressures for use in a heating system. As the description proceeds, it will become apparent that this valve is susceptible to use for other purposes, and may be used to supply steam at either high or low pressures, either above or below atmospheric pressure, but it is particularly adapted for the use first above mentioned.

In a well known type of reducing valve, the valve casing is divided by an internal web into high and low pressure chambers, the high pressure chamber being in communication with the steam source, and the low pressure chamber supplying the reduced pressure steam to the radiators, or for other purposes. A movable valve, or set of valves, controls communication between the high and low pressure chambers through valve openings in the web. The valves are automatically moved toward or from their seats by a valve stem connected to the central portion of a flexible diaphragm mounted in a separate casing. The chamber at one side of the diaphragm is in communication with the low pressure side of the valve, and the other side of the diaphragm is subject to atmospheric pressure, so that as the pressure at the low-pressure side of the valve varies, the pressure difference exerted on the two sides of the diaphragm will vary and thus tend to flex the diaphragm and move the valves. A spring or a balancing weight is connected with the valve stem so as to exert a constant pressure opposing the pressure differential exerted on the diaphragm. By suitably adjusting this constant pressure device, the pressure maintained at the low pressure side of the valve may be varied, as desired. Valves of this type heretofore used for obtaining sub-atmospheric-pressures have not been entirely satisfactory, since they were sluggish in action and did not accurately maintain the desired pressures. Furthermore, in order to operate effectively, a diaphragm of fairly large diameter must be used, and for opposing the action of this diaphragm, an exceedingly large amount of weight, in the case of weight-loaded valves, is required for producing sub-atmospheric pressures. Furthermore, the stuffing boxes heretofore used about the valve stem in devices of this type have tended to increase the sluggishness of the apparatus.

The principal object of the present invention is to increase the sensitiveness of a reducing valve of this type, reduce to a minimum the amount of balancing weight that will be required for a maximum vacuum or minimum sub-atmospheric pressure, and produce a valve that will be compact and may be easily adjusted by the operator from the boiler room floor.

Another object is to provide a reducing valve embodying opposed diaphragms of different areas so that the movement of the valves will respond to the difference in the pressure exerted by the two diaphragms, thus greatly reducing the constant pressure that must be applied to the valve stem by means of weights or springs.

Another object is to provide a reducing valve of this type in which water seals are provided about the valve stem so as to eliminate all stuffing boxes.

Another object is to provide a dampener or dashpot applied to the valve stem so as to avoid undue pulsations or fluctuations of the valves.

Another object is to provide improved means for mounting the balancing weights.

Other objects and advantages of this invention will be more apparent from the detailed description of certain approved forms of the apparatus.

In the accompanying drawings:

Fig. 1 is a central vertical section through one form of the improved valve.

Fig. 2 is a similar view, showing a modified form of the valve.

Referring first to the form of the invention shown in Fig. 1, the valve casing 1 is provided with an inlet port 2 communicating with a pipe 3 leading from the steam supply, and with an outlet port 4 communicating with a pipe 5 which delivers the low pressure steam to the radiators or other apparatus. An internal web 6 divides the casing 1 into a high pressure chamber 7 and a low pressure chamber 8, the web 6 comprising parallel horizontal portions 9 and 10 provided with aligned vertical valve openings, in which are positioned the valve seats 11 and 12. The semi-balanced valves 13 and 14, connected to operate in unison by the stem 15, are adapted to engage respectively the valve seats 11 and 12 to cut off communication between the high pressure chamber 7 and the low pressure chamber 8. When these valves are raised from their seats, by the mechanism hereinafter described, the steam will flow from the high pressure source through the valve openings into the low pressure chamber 8, so as to increase the quantity of steam therein and consequently elevate the low pressure. When this low pressure has been raised to the desired maximum, the valves 13 and 14 will be automatically moved against their seats so as to prevent the further passage of steam into low pressure chamber 8, and the subsequent usage or condensation of the steam at the low pressure side of the valve will lower this pressure until a desired minimum has been reached, at which time the valves 13 and 14 will again be raised to admit more steam into chamber 8.

The upper portion 16 of a diaphragm casing has an outwardly projecting flange 17 secured to the bottom of casing 1, and an upwardly extending annular flange 18 adapted to properly center the casing within the opening in the bottom of casing 1. A circular flexible metallic or composition diaphragm 19 is clamped at its outer edge between the dished lower portion of casing 16, and the lower diaphragm casing member 20. These dished casing members 16 and 20 are secured together about the diaphragm 19 by a plurality of bolts 21. The chamber 22 at the lower side of diaphragm 19 is in communication with the outer atmosphere through central opening 23. The chamber 24 above diaphragm 19 is in communication with the low pressure pipe 5 through conduit or pipe 25. Preferably this pipe 25 connects with the low pressure pipe 5 at a point considerably removed from the reducing valve, so as to avoid the fluctuations in pressure which occur directly within the chamber 8. The chamber 24 above diaphragm 19, and pipe 25 leading thereto, will become filled with liquid condensate, so as to form a water seal, preventing the direct contact of steam with the diaphragm 19.

A valve stem 26 is secured at its upper end to the valve assembly 13, 14 and 15, projects downwardly through the slide bearing 27 in the web 28 which separates chamber 8 of casing 1 from chamber 24 of the diaphragm casing, and projects through a central opening in diaphragm 19 and thence through opening 23 in the bottom of the diaphragm casing 20. The stem 26 is sealed to diaphragm 19 so as to move therewith and so as to prevent the passage of fluids through the diaphragm, by means of diaphragm plates 29 and nuts 30 threaded upon the lower portion of valve stem 26.

It will be noted that the low pressure existing in chamber 8 is substantially the same as the pressure in chamber 24 so that no stuffing box is required at 27, and this bearing serves principally as a guide for the stem and need not be sufficiently tight to impede the vertical movement of the valve stem.

A lever 31 is intermediately pivoted at 32 in a yoke member 33 screwed on the lower end of valve stem 26 and held in place by lock nut 34. A fulcrum link 35 is pivoted at its lower end 36 to lever 31, and is pivotally hung at 37 from bracket 38 formed on diaphragm casing 20. The two arms of lever 31 are notched at 39 to hold the supporting yokes 40 and 41, which carry the adjustable weights 42 and 43, respectively. It will be apparent that by varying the amount of the weights 42 and 43, and by varying their distances from the fulcrum point 36 by adjusting the yokes 40 and 41 in notches 39, the vertical pressure exerted on the lower end of valve stem 26 may be varied, as desired. The use of the fulcrum link 35 avoids all lost motion between lever 31 and valve stem 26, and reduces to a minimum the side thrusts on the valve stem.

A second valve stem 44, which is practically an upward extension of the lower valve stem 26, is secured at its lower end to the valve assembly 13, 14 and 15, and its upper threaded end passes through a central opening in a second flexible diaphragm 45. Valve stem 44 is secured to diaphragm 45 by the upper diaphragm plate 46 and lower inverted cup 47, these parts being clamped against the diaphragm by the nuts 48 and 49 screwed on the valve stem 44. The circular flexible metallic diaphragm 45, which is of less area than the lower diaphragm 19, is clamped at its outer edges between the opposed dished casing members 50 and 51, secured together by bolts 52. The upper casing member 50 is provided with apertures 53, through which air at atmospheric pressure is admitted to the chamber 54 above diaphragm 45. The lower member 51 of the diaphragm casing has a downwardly extending cylindrical portion 55 and an inwardly extending bottom portion 56 mounted in an opening in the top of valve casing 1, and secured thereto by means of the outwardly extending flange 57 and bolts 58. A central upwardly extending tubular portion 59 completes an annular well 60 formed in the lower casing member 51. The sides 61 of the inverted cup project downwardly into annular well 60. The valve stem 44 projects upwardly through the tubular portion 59, and an annular steam passage or conduit 62, between stem 44 and tubular member 59, permits steam at the low pressure existing in chamber 8, to flow into the inverted cup 47. The annular well 60 will be maintained filled with liquid condensate, by condensation of steam. The body of liquid in well 60 is sufficiently large so that it is never entirely displaced by the vertical movements of the inverted cup, so that there will always be a liquid seal which will prevent the steam within the cup from coming in contact with the diaphragm 45. However, the entire movable lower surface of diaphragm 45 will be subjected to a pressure equal to that of the steam at the low pressure side of the valve. Aside from serving as a liquid seal, the movements of the inverted cup within the liquid confined in the annular well, have a dashpot effect, tending to dampen any vibrations that might result from rapid pressure fluctuations, due to the flow of steam through the valves.

It will be noted that each of the diaphragms 19 and 45 is subject to a force equal to the difference in pressure between atmosphere and the pressure existing in the low pressure side of the system, multiplied by the exposed area of the respective diaphragm. It will be noted that these forces will always be opposed to one another, but the effective area of the lower diaphragm 19 is greater than the effective area of the upper diaphragm 45 so that a force equal to the difference between these opposed forces will be available to move the valves 13 and 14 toward or from their seats. This latter force is opposed by the adjustable weights 42 or 43, so as to secure the desired pressure at the low pressure side of the valve.

If there is a preponderance of weight applied to the right hand arm of lever 31, there will be a constant downward force exerted on the valve stems tending to hold the valves 13 and 14 upon their seats 11 and 12. In order to overcome this force and open the valves, the pressure differential applied to the diaphragm 19 must exert an upward pressure on the valve stem 26. It will be apparent that in order to secure this pressure differential the pressure in the upper chamber 24 will have to be below atmospheric. As the preponderance of weight on the right hand arm of lever 31 is increased, the pressure in chamber 24 will have to be lowered (or the vacuum increased) in order that the pressure differential applied to diaphragm 19 will be sufficient to overcome the opposed pressure differential on diaphragm 45 and also lift the weights. The valves 13 and 14 will therefore remain closed until this vacuum is attained in the low pressure side of the system, whereupon the valves 13 and 14 will be opened to admit more steam into low pressure chamber 8. As soon as the sub-atmospheric pressure has been raised above the vacuum for which the valve is set, the pressure differential exerted on diaphragm 19 will be no longer sufficient to hold up the weights, and the valves 13 and 14 will be automatically closed.

It will be apparent that if a preponderance of weight is applied to the left hand arm of lever 31, this will result in a constant upward pressure on the valve stems tending to open the valves 13 and 14. In order to counter-act this pressure and close the valves, the pressure in chamber 24 (and hence in the low pressure side of the system) must be greater than atmospheric. In this way the valve may be used to maintain super-atmospheric pressures at the low pressure side of the valve, these pressures, however, being lower than the pressure existing in the supply pipe 3.

It will be noted that in every case, the action of the upper diaphragm 45 is to oppose the action of the lower diaphragm 19, thereby reducing the amount of constant pressure that must be applied by means of the adjustable weights 42 and 43. The steam does not come in direct contact with either of the diaphragms, and there is no necessity for any stuffing boxes about either of the valve stems. This greatly reduces the friction of the moving parts, and the valves also have a better floating action, since they are suspended between two movable diaphragms.

In the modification shown in Fig. 2, the construction of the valve casing 1 and the valve assembly mounted therein, is essentially the same as in the first described form of the invention. The upper diaphragm casing shown in Fig. 1 is omitted, the upper opening in casing 1 being closed by a fixed cap or closure plate 63. A lower casing member 64 has an upper outwardly projecting flange 65 secured to the bottom of casing 1 by bolts 66, an upwardly extending annular flange 67 serving to center the casing member 64 within the opening in the bottom of casing 1. The valve stem 68 secured at its upper end to the valve assembly, projects downwardly through an opening in the upper web 69 of casing member 64. The larger flexible diaphragm 19 is secured centrally on valve stem 68 by means of the diaphragm plates 70 and nut 71 threaded on the lower end 72 of valve stem 68. The outer periphery of diaphragm 19 is clamped between the dished lower portion 73 of casing 64, and the dished upper portion 74 of the yoke housing 75, which is suspended from casing member 64. An opening 75' in the bottom of casing 74, through which valve stem 68 loosely projects, serves to admit air at atmospheric pressure to the chamber 76 below diaphragm 19. The yoke casing 75 has a dished lower end 77 forming a chamber 78 above the smaller diaphragm 45, which is clamped at its outer edges against the casing 77 by the lower dished casing member 79 secured thereto by bolts 80. Air at atmospheric pressure is admitted to the upper chamber 78 through central opening 81 in casing 77, and the chamber 82 below diaphragm 45 is placed in communication with the low pressure side of the system by means of pipe or conduit 83.

An auxiliary upwardly projecting valve stem 84 which aligns with the valve stem 68, is secured centrally to smaller diaphragm 45 by means of diaphragm plates 85 and nut 86 threaded on the lower end of stem 84. The lower end of stem 68 and the upper end of stem 84 are respectively threaded into a yoke member 87 and fastened by lock nuts 88. The weight-carrying lever 31 (which is essentially the same as disclosed in Fig. 1) is centrally pivoted in yoke 87 at 89.

A conduit 90, formed in the several casing members 64, 75 and 79, serves to place chamber 91 above the upper diaphragm 19 in communication with the chamber 82 below diaphragm 45, so that the low pressure existing in the system will be maintained in both of these chambers.

The operation of this second form of the invention is substantially the same as described in connection with the form first disclosed. The smaller diaphragm 45 constantly opposes the larger diaphragm 19. The chambers 91 and 82, as well as conduit 83, will become filled with liquid, and the flow of liquid through the connecting conduit 90 will have a dampening effect on the system so as to resist minor pressure fluctuations in the low pressure chamber. It will also be noted that the steam does not contact with either of the diaphragms, and that no stuffing boxes are required.

It will be apparent that in either form of the invention the adjusting weights 42 and 43 are easily accessible from below the valve. The arms 92 of the yokes which suspend these weights may be made as long as desired, in order that the weights may be readily accessible. The use of adjustable weights on both arms of the lever, as well as means for varying the length of each of the lever arms, permits a very wide range of adjustment for the pressure maintained at the low pressure side of the valve.

I claim:

1. A reducing valve comprising a valve casing divided into high and low pressure chambers, a valve opening between the chambers, a vertically movable valve controlling communication through the valve opening, a valve stem attached to the valve and projecting upwardly and downwardly therefrom, a diaphragm casing mounted below the valve casing, a horizontal diaphragm therein dividing the chamber into upper and lower chambers, the diaphragm being attached to the valve stem, a conduit leading from the upper chamber of the diaphragm casing to the low pressure side of the valve, the lower chamber being open to the atmosphere, means for exerting a constant but adjustable vertical pressure on the valve stem, a second diaphragm casing mounted above the valve casing, a diaphragm of less area than the first named diaphragm dividing this second casing into upper and lower chambers, the upper chamber being open to the atmosphere, the lower portion of the casing being extended downwardly in the form of an annular well adapted to hold a liquid, the valve stem projecting upwardly through the central opening in the well and being attached to the upper diaphragm, and an inverted cup secured to the lower side of the upper diaphragm and projecting downwardly into the annular well, there being a conduit surrounding the valve stem and establishing communication between the low pressure chamber of the valve casing and the interior of the inverted cup.

2. A reducing valve comprising a valve casing divided into high and low pressure chambers, a valve opening between the chambers, a vertically movable valve controlling communication through the valve opening, a valve stem attached to the valve and projecting upwardly and downwardly therefrom, a diaphragm casing mounted below the valve casing, a horizontal diaphragm therein dividing the chamber into upper and lower chambers, the diaphragm being attached to the valve stem, a conduit leading from the upper chamber of the diaphragm casing to the low pressure side of the valve, the lower chamber being open to the atmosphere, means for exerting a constant but adjustable vertical pressure on the valve stem, a second diaphragm casing mounted above the valve casing, a diaphragm of less area than the first named diaphragm dividing this second casing into upper and lower chambers, the upper chamber being open to the atmosphere, the lower chamber being in communication with the low pressure chamber of the valve casing, and the upwardly projecting portion of the valve stem being attached to the upper diaphragm and means for maintaining a water-seal between the low pressure steam and the upper diaphragm.

3. A reducing valve comprising a valve casing divided into high and low pressure chambers, a valve opening between the chambers, a vertically movable valve controlling communication through the valve opening, a valve stem attached to the valve and projecting upwardly and downwardly therefrom, a diaphragm casing mounted below the valve casing, a horizontal diaphragm therein dividing the chamber into upper and lower chambers, the diaphragm being attached to the valve stem, a conduit leading from the upper chamber of the diaphragm casing to the low pressure side of the valve, the lower chamber being open to the atmosphere, means for exerting a constant but adjustable vertical pressure on the valve stem, a second diaphragm casing mounted above the valve casing, a diaphragm of less area than the first named diaphragm dividing this second casing into upper and lower chambers, the upper chamber being open to the atmosphere, the lower chamber being in communication with the low pressure chamber of the valve casing, and the upwardly projecting portion of the valve stem being attached to the upper diaphragm and a dashpot device comprising a well for holding liquid and a member attached to the valve stem and movable within the well.

CLAYTON A. DUNHAM.